United States Patent [19]

Scarbro

[11] 4,219,709

[45] Aug. 26, 1980

[54] STEERING COLUMN MOUNTED CONTROL STALK MOTION TRANSLATION ASSEMBLY FOR OPERATING SWITCHES

[75] Inventor: William D. Scarbro, Royal Oak, Mich.

[73] Assignee: Chrysler Corporation, Highland Park, Mich.

[21] Appl. No.: 925,079

[22] Filed: Jul. 17, 1978

[51] Int. Cl.² .............................................. H01H 9/00
[52] U.S. Cl. ................................... 200/61.54; 200/4; 200/61.27
[58] Field of Search ............... 200/4, 17 R, 18, 61.27, 200/61.3, 61.34, 61.35, 61.54; 74/471

[56] References Cited

U.S. PATENT DOCUMENTS

| | | | |
|---|---|---|---|
| 3,221,119 | 11/1965 | Weathers et al. | 200/61.27 |
| 3,331,932 | 7/1967 | Winogrocki et al. | 200/61.34 |
| 3,374,321 | 3/1968 | Trarbach | 200/61.27 |
| 3,604,975 | 9/1971 | Suzuki et al. | 200/61.27 X |
| 3,881,076 | 4/1975 | Latka et al. | 200/61.54 |
| 4,006,328 | 2/1977 | Kimberlin et al. | 200/61.27 X |
| 4,088,858 | 5/1978 | Kramer | 200/61.27 |

Primary Examiner—James R. Scott
Attorney, Agent, or Firm—Baldwin & Newtson

[57] ABSTRACT

A motion translating assembly for a steering column mounted control stalk mechanically coupled to a vehicle turn signal switch coaxially mounted on the steering column and to a headlamp beam section or dimmer switch displaced longitudinally of the steering column and enabling selective independent actuation of the switches for swingable movement of the control stalk in a pair of mutually orthogonally related planes. The motion translating assembly is coupled to the switches in such manner as to permit the use of conventional commercially available forms of such switches without extensive modification or revision thereof.

3 Claims, 13 Drawing Figures

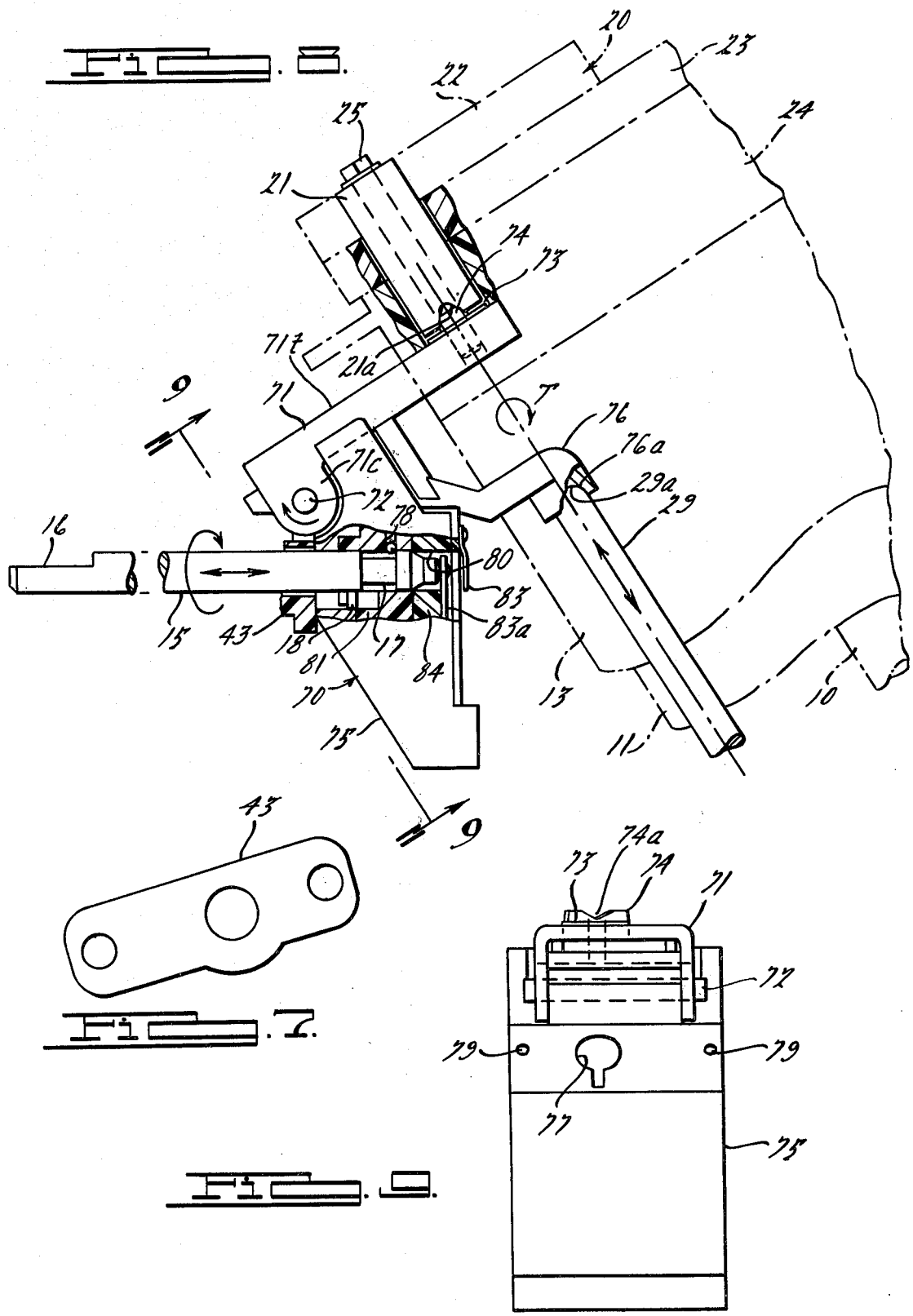

STEERING COLUMN MOUNTED CONTROL STALK MOTION TRANSLATION ASSEMBLY FOR OPERATING SWITCHES

FIELD AND BACKGROUND

This invention relates to vehicle steering column mounted control stalks, and, more particularly, to a motion translating assembly enabling selective independent actuation of a pair of multiple contact switches mounted on the steering column from swingable movement of the control stalk in a pair of mutually orthogonally related intersecting planes.

The form of the control stalk illustrated herein forms the subject matter of U.S. Ser. No. 925,080, filed of even date and of common ownership herewith. The control stalk is especially suited for use in an automotive vehicle speed control and windshield wiper motor and washer pump motor control application that is accomplished from a pair of juxtaposed slidable actuator buttons and a rotary and push-type control knob carried on a handle surrounding the steering column-mounted control lever.

The control lever is mounted for singable movement in a first plane transverse to the longitudinal axis of the steering column for a turn signal actuator application and in another intersecting plane, which is mutually orthogonally related to the first plane and contains or is parallel to the longitudinal axis of the steering column for headlamp beam selection and/or light modulated signalling application. The separate movements of the control lever are translated through a motion translating assembly for separate and selective actuation of the turn signal switch and beam selection switch, each to the exclusion of the other.

In addition to the known prior art patents on control stalks referenced in the above application, the following patents illustrate multiple switch control applications accomplished from a steering column mounted control lever: U.S. Pat. Nos. 3,221,119; 3,254,168; 3,331,932; 3,334,201; 3,374,321; 3,459,913; 3,476,896; 3,881,076; and 4,006,328.

The present invention seeks to provide a control stalk activated motion translating assembly which enables selective actuation of a column mounted turn signal switch and beam selection switch and is coupled thereto in such a manner as to permit use of conventional switches without modification thereof.

The above and other objects, advantages and features of the invention will appear more fully from consideration of the following detailed description made with reference to the accompanying drawings.

DESCRIPTION OF THE DRAWINGS

FIGS. 4, 5, 6 and 7 are transverse sectional views and an enlarged end view taken in the directions 4—4, 5—5, and 6—6 of FIGS. 3 and 4;

FIG. 7 is a view of a bracket on the inner end of the control handle of FIG. 2;

FIG. 8 is a fragmentary side elevation view with parts broken away of the yoke or motion translating assembly of the present invention as coupled to the vehicle steering mounted turn signal switch and headlamp beam selection switch;

FIG. 9 is a frontal view of the motion translating assembly with the control lever removed and taken in the direction 9—9 of FIG. 8;

DESCRIPTION OF THE PREFERRED EMBODIMENT

Figure 1:
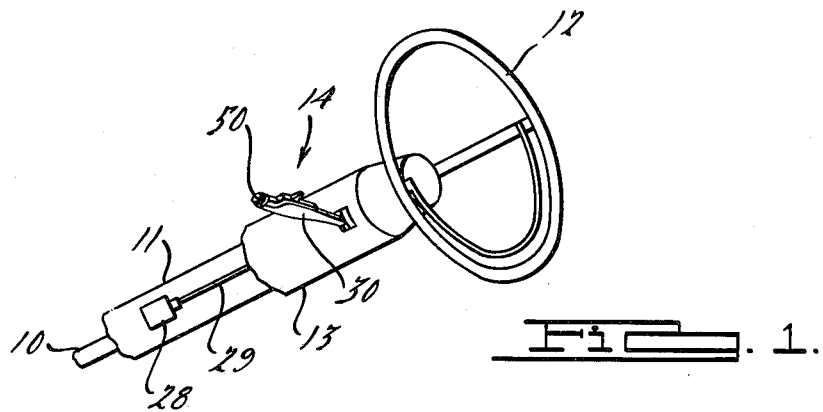
FIG. 1 illustrates a vehicle steering column-mounted control stalk environment in which the present invention is employed.

With reference to the drawings, FIG. 1 illustrates a rotatable steering shaft 10 enclosed in a stationary cylindrical jacket or column 11 and mounting a movable steering wheel 12 at one end thereof. Extending from one side of and in a direction transverse to the longitudinal axis of the column is a control stalk assembly 14 surrounding a central control shaft or lever 15, which may be the swingably mounted actuator or lever for the vehicle turn signal control switch assembly 20. The turn signal switch may be of the general type with lane change signalling features currently supplied by Essex International, Inc. as illustrated in U.S. Pat. No. 3,372,252, for example and is mounted below and coaxially of the steering wheel 12 on a stationary bearing plate 24 as shown in FIG. 8 attached to the upper end of the column 11. The control lever further is swingably mounted in a second plane mutually orthogonally related to the turn signal actuation plane, which includes or is parallel to the longitudinal axis of the column, for actuation of a vehicle headlight dimmer switch 28. The dimmer switch 28 is mounted along the column 11 and provides for manual Hi-Lo beam selection and/or cyclical interrupting Hi-beam signalling, sometimes called "optical horn38 , applications, the latter being accomplished from partial swingable movement of the control lever in the aforesaid second plane.

Figures 4, 5, 6:
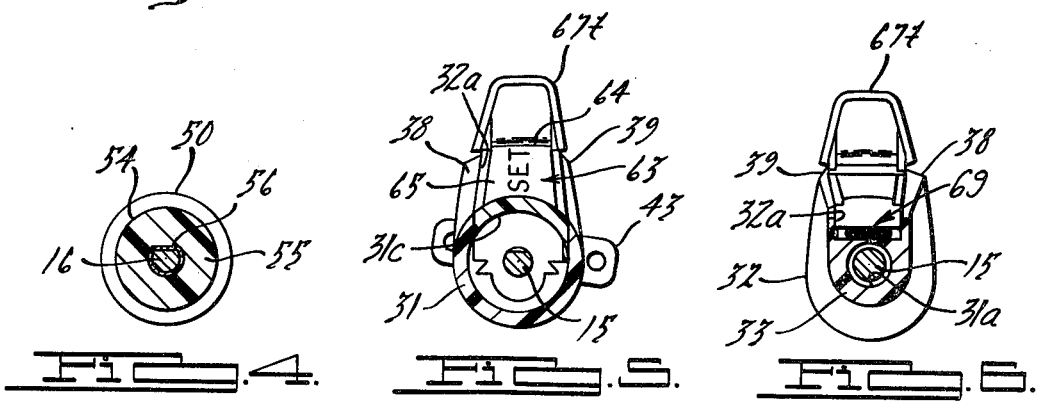

The illustrated operating handle 30 is a hollow elongated tubular, molded plastic structure having a short cylindrical outer end section 31 of generally circular cross-section; and elongated channel-shaped, palm fitting intermediate section 32; and a tubular inner end section 33. On the outer end section 31 is a sort horizontal index or graduation 34 and a pair of spaced apart triangular or arrow-shaped indicia 35, 36 between which is located an arcuate sector-shaped windshield wiper symbol depicted at 37 and bearing the legend "WIPE". Adjacent the inwardly directed arrow 36 is the legend "WASH". Extending from the outer end section of the handle is a circular cylindrical control knob 50, which has a circumferentially knurled or fluted outer end portion 51 and a stepped or reduced inner end 54. The reduced end 54 of the knob 50 is received within the counterbored end 31c of the outer end section 31 of the handle, which has a longitudinally extending central bore 31a therethrough in which is received the lever 15. As shown in FIGS. 4 and 8, the control knob is releasably attached by an expandible circular spring 56 which is contained within a central section 55 of the knob, to a D-shaped section 16 at the outer end of the control lever 15 in the manner of radio volume and tuner control knob and shaft assemblies, for example.

Figure 2:
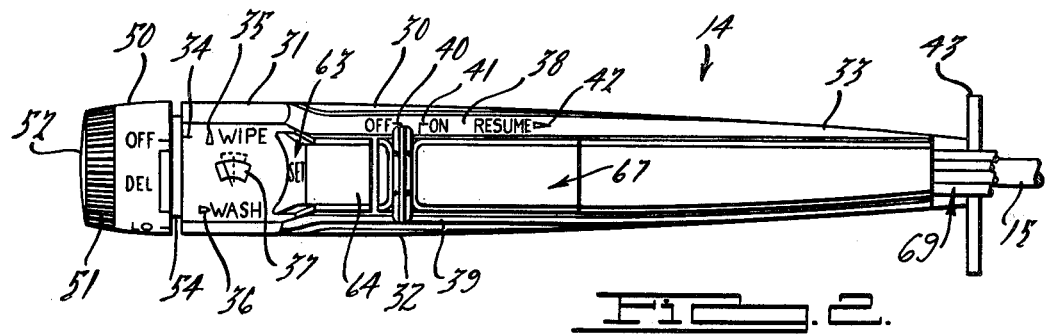
FIG. 2 is a frontal or top plan view, as viewed from the seating position of an operator, of the control handle and actuators or the control stalk as employed in FIG. 1.

The intermediate section 32 of the operating handle or cover 30 is of integral molded formation with and is of somewhat greater longitudinal extent than the outer end section 31. With reference to FIG. 5, the intermediate section 32 has a pair of upwardly or forwardly extending, spaced-apart and curved side walls 38, 39 or which the wall 38 is somewhat thicker than wall 39 for reception and display of a pair of spaced apart inverted and oppositely directed or facing L-shaped graduations 40, 41 and legends or indicia thereon, including OFF, ON and RESUME, and an inwardly directed arrow-shaped graduation 42 as shown in FIG. 2. The spaced apart walls 38, 39 of the intermediate section 32 define the aforementioned channel 32a having a longitudinal extending opening from one side of the handle in which is received the plural slide switch assembly 60 depicted schematically in FIG. 10 for controlling the vehicle speed control functions and the actuators therefor described hereinafter.

The tubular inner end section 33 of the operating handle 30 may be of integral formation with the intermediate section 32 and has an integrally formed flanged bracket 43 shown in FIG. 7 thereon by which the handle is affixed to a longitudinally immovable portion of a motion translating assembly 70, also called a yoke herein. The latter is pivotally mounted to the turn signal switch bearing plate 24, which is attached to the upper end of a short cylindrical lock housing cover 13 surrounding the jacket 11 and the upper end of the shaft 10, and enables the aforesaid swingable movements by the operator of the control stalk assembly 14 for the headlamp beam switching and turn signalling operations to be separately translated, coupled or transferred to selectively actuate the respective headlamp dimmer and turn signal switches.

Figure 12:
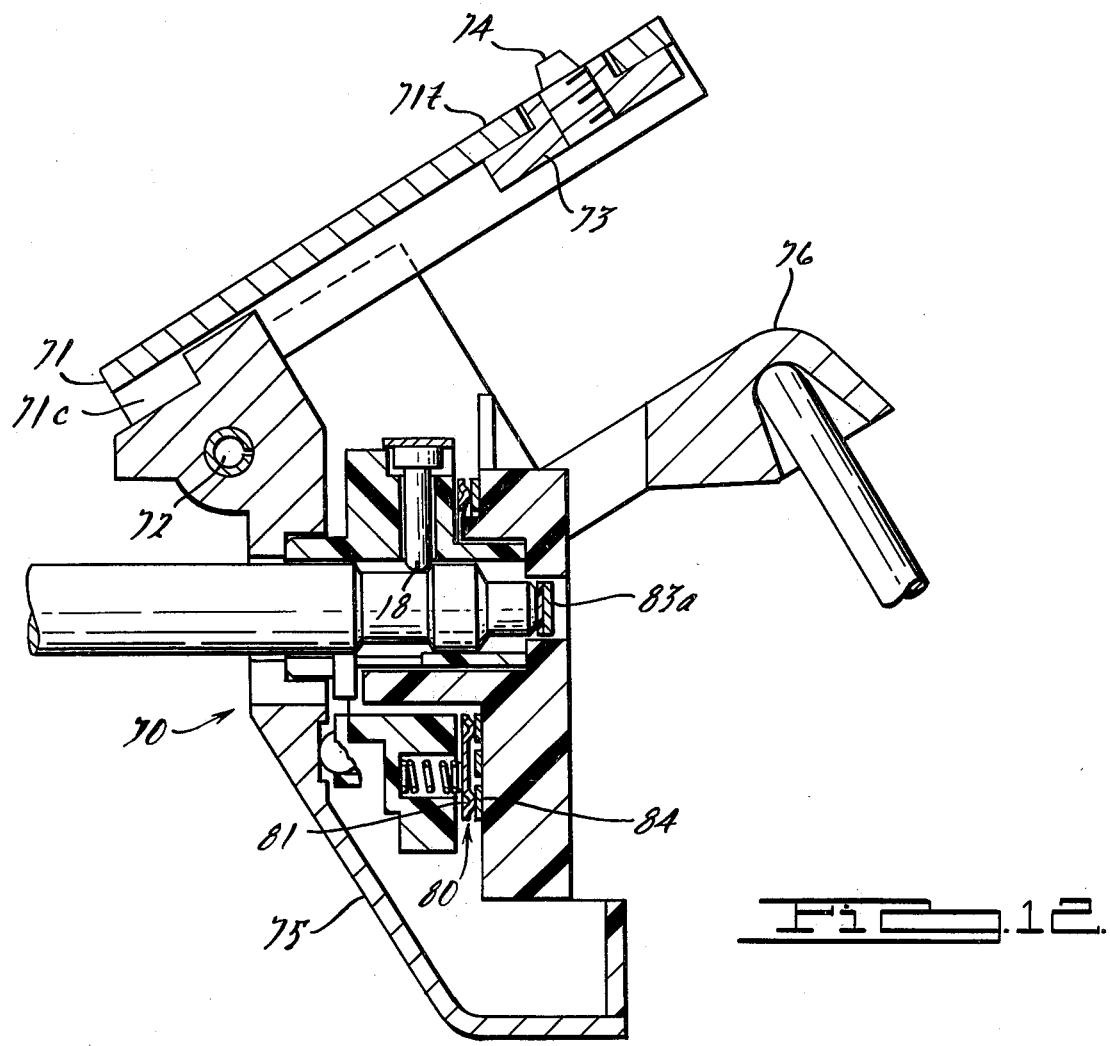
FIG. 12 is an enlarged view of a form of motion translating assembly, similar to FIG. 8, with further details of construction thereof.

As shown in FIGS. 8, 9 and 12, the motion translating assembly 70 comprises a first portion 71 having a tongue member 71t extending inwardly toward the steering column from an inverted, U-shaped clevis portion 71c pivotally mounted at 72 to a second member in the form of a yoke-shaped block or switch housing 75 in which is suitably fastened as by staking, a depending lever or arm portion 76. The latter element, which could be of integral molded formation with the switch housing, extends from one side or face of the switch housing 75 inwardly toward the steering column 11 and has a cone-shaped pocket 76a therein which engages the rounded upper end 29a of a rod 29 extending longitudinally of the column.

The other end of the rod 29 engages an upwardly or outwardly spring biased actuator 28a of the S.P.D.T. headlamp HI-LO beam selector or dimmer switch 28, which is fixedly mounted on the exterior of the column 11. Thus, swingable movement of the control lever 15 in a direction upwardly or toward and downwardly or away from the operator and in a plane containing or parallel to the longitudinal axial plane of the steering column pivots the entire block housing 75 and not the tongue member 71 about the generally horizontally extending pivot 72 to longitudinally reciprocate the rod 29.

As shown in FIG. 8, the control lever 15 has a circumferential groove 17 and a radially extending drive pin 18 near the inner end thereof, which is received in a keyhole shaped slot 77 in the switch block housing 75 and in an aligned opening in the windshield wiper motor and washer pump motor control switch assembly 80. The control lever 15 is resiliently releasably retained by a spring urged pin 78 in the switch assembly 80, which is mounted in the housing 75 to which the control lever 15 is releasably fastened and mounted for rotative as well as for limited longitudinal axial movement. Mounting holes 79 are provided on the housing 75 to which the bracket 43 on the inner end of the control handle 30 is fastened by self-taping screws (not shown), whereby the control handle is fixed against movement relative to the housing 75.

The control lever 15 may thus be rotated or pushed via the control knob 50 for rotational or limited axial longitudinal movement relative to the control handle, which is pivotally and swingably mounted with the control lever to accomplish the aforementioned headlamp beam selection or dimming actuation functions described above and the actuation of the turn signal switch. Actuation of the turn signal switch from the control lever 15 pivots the motion translating entire assembly 70 about the turn signal pivotal axis shown as a generally vertically extending axis T normal to and passing through the end of the tongue 71t opposite the generally horizontally extending pivot 72 thereof. The end of tongue 71t has a V-shaped notched nib 74 formed thereon below which is a threaded nut 73, which could be of integral formation with the nut, if desired. Nib 74 is located at the aforesaid vertical pivot axis T and is received within a complementary V-shaped slotted end portion 21a of a cylindrical drive transmitting sleeve or post 21, the upper end of which is molded in or otherwise suitably affixed to the movable switch contactor portion 22 of the turn signal switch. The lower end of the sleeve 21 passes freely through the stationary bearing plate 24 and the stationary contact carrying portion 23 of the turn signal switch 20. Sleeve 21 is fastened to the movable switch contactor actuator portion 22 to move the latter relative to stationary portion 23 and the bearing plate 24 upon oscillation or rocking movement of the sleeve which is secured to the internally threaded nut 73 on tongue 71 of the yoke assembly by a threaded screw 25.

As the pivot axis T of the turn signal switch is aligned with the longitudinal axis of rod 29, oscillation of the yoke motion translating assembly 70 by the control lever 15 about the vertical axis T of the turn signal switch will not reciprocate the rod 29 while up and down movement of the control lever rocks the housing block 75 of the motion translating assembly assembly 70 about the pivot pin 72 to reciprocate the rod 29 without rocking the tongue portion 71t of the motion translating assembly and affecting the turn signal switch. It will be further appreciated that the simple fastening of the yoke assembly to the conventional turn signal switch by way of the threaded fastener screw 23 avoids the necessity of additional interposed or intervening parts without extensive revision or modifications of the turn signal switch.

The windshield wiper motor and washer pump motor control switch assembly 80 for a two speed wiper motor application comprises, as shown in FIGS. 8 and 12, a ganged two-pole rotary wiper switch 82 rotatively indexable into three detantable positions by rotation of the control lever 15 by the control nob 50 from an OFF to separate Lo-speed and Hi-speed control positions and further contains a washer pump motor control switch 83a. Switch 83 is actuable from a normally open to a momentary switch contact completing position against contact 83a by longitudinal axially inwardly directed movements of the lever 15 from the control knob 50, as by pushing the outer end 52 thereof inwardly toward the steering column.

Figure 11:
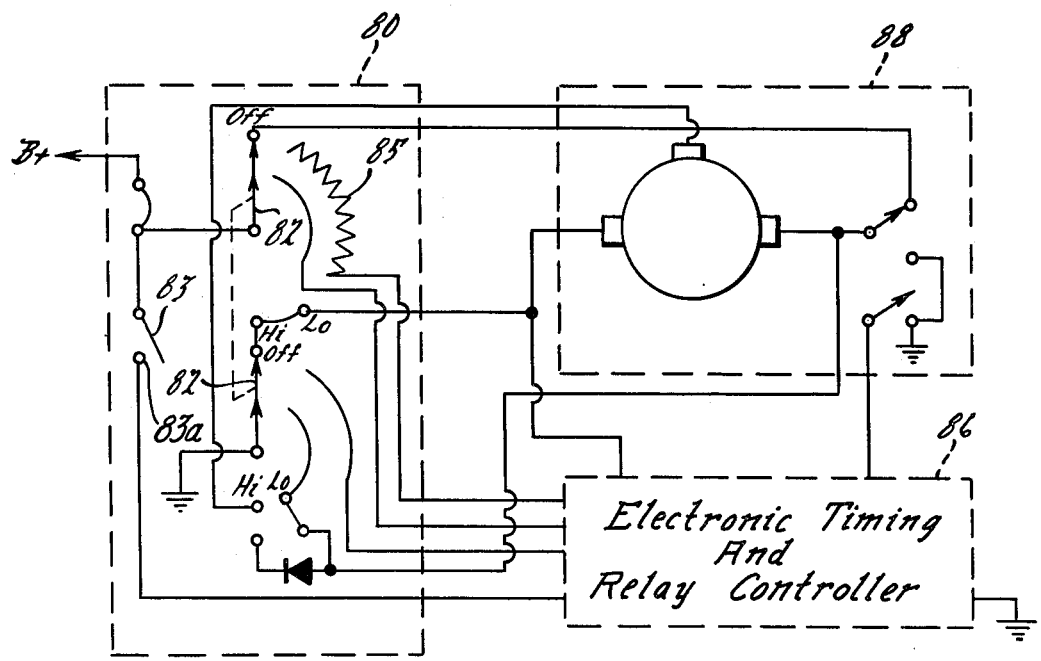
FIG. 11 is an electrical schematic representation of the windshield wiper drive motor and washer pump motor switches and circuits controlled by the windshield wiper and washer actuators or the control stalk handle.

For intermittent windshield wiper control applications as depicted in FIG. 11, the control switch assembly 80 further includes a variable resistance element 85 whose resistance presented to an electronic timing and relay controller 86 is varied from a maximum to a minimum by an arcuately movable wiper arm portion on one of the two poles 82 of the wiper switch assembly 80. Switch 80 comprises a rotary portion 81 and a stationary contact carrying terminal board portion 84 of which the rotary portion 81 is coupled to the drive pin 18 of the control lever 15 for movement over a limited range of rotational movement of the control knob 50 between the OFF positional setting thereof and its aforesaid Lo-speed setting. The aforementioned electronic controller 86 includes a relay actuated switch, which controls the energization of the three brush, two speed D.C. drive motor 88, and a cyclically operating timing circuit, which sets the delay period between successive wiping or drive cycles of the windshield wiper motor 88 in accordance with the resistance setting of the variable resistor 85, as more fully described in U.S. Pat. No. 4,158,159 and of common ownership herewith.

Figure 10:
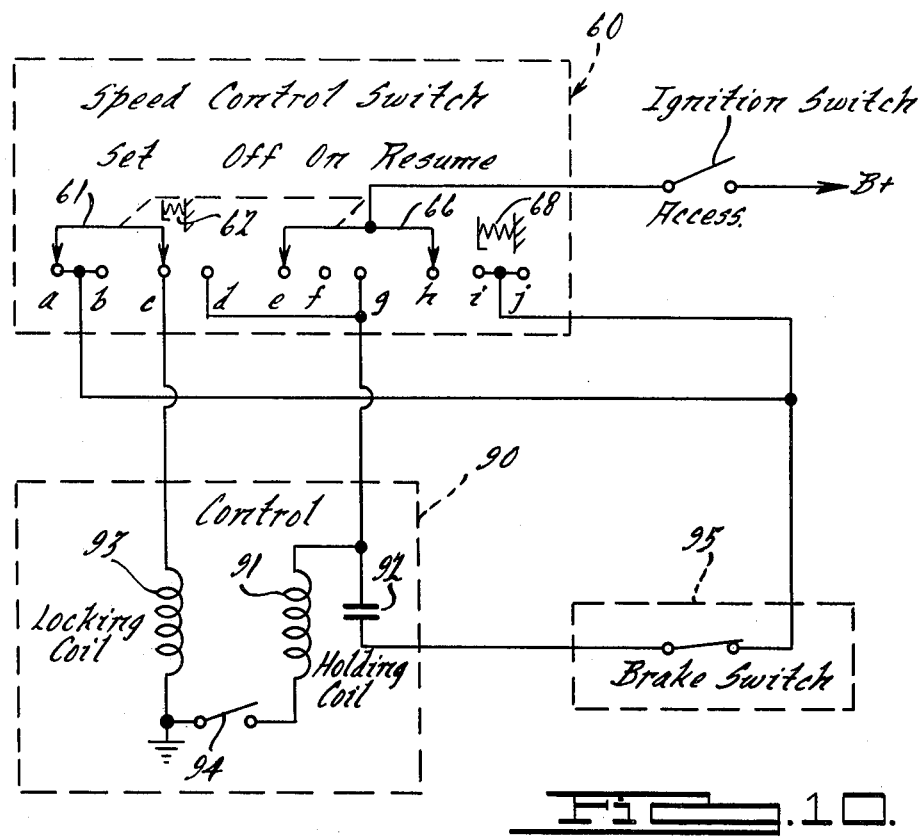
FIG. 10 is an electrical schematic representation of the switches and wiring circuits controlled by the vehicle speed control switch actuators of the control stalk handle.
Figure 13:
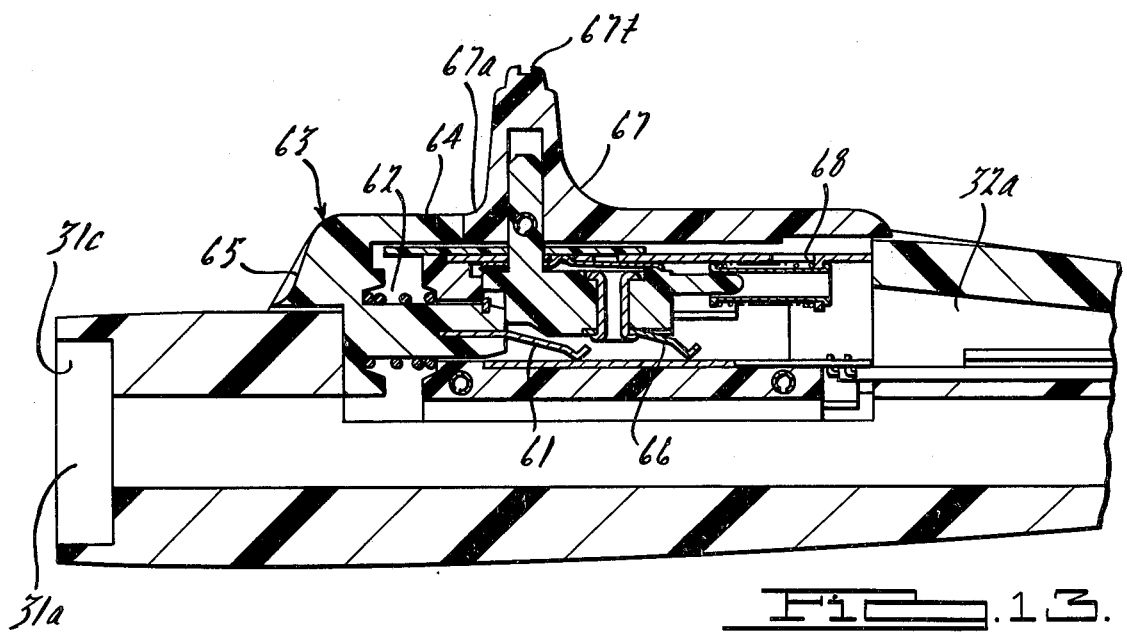
FIG. 13 is an enlarged sectional view of the operating control handle of FIG. 3 showing details of the plural slide switch assembly housed therein.

The speed control switch assembly 60, which is depicted electrically schematically in FIG. 10 herein, is shown mechanically in FIG. 13 as a plural slide switch assembly, which is received together with several electrical conductors 69 therefrom interiorly of the intermediate section 32 of the operating handle in the space between the lever 15 and the curved side walls 38, 39 of the aforesaid channel shaped opening 32a therein. The switch assembly includes a pair of double pole slide switches, 61 and 66 of which switch 61 is the SET switch and switch 66 is the OFF-ON-RESUME switch. Switch 61 is movable by the first actuator button 63, labelled SET and against the bias of a spring, depicted at 62, from a first stable and switch contact completing position to a second and momentary contact circuit completing position from which it is returned to its first position by the aforesaid spring 62 release of the first actuator button 63. The other slide switch 66 is slidably movable conjointly with the first mentioned slide switch 61 by the first actuator button 63 or is movable independently of the first slide switch by a second actuator button 67 from a first stable or OFF position to a second stable and switch contact completing position, labelled ON. Switch 66 is further movable by the second actuator button 67 independently and exclusively of the first actuator button 63 and associated slide switch 61 to a third momentary switch contact position, labelled RESUME, from which it is returned to its second stable or ON position by a compression spring depicted at 68 upon release of the second actuator button 67, which is secured to the slidable or moveable portion of the second slide switch 66.

Figure 3:
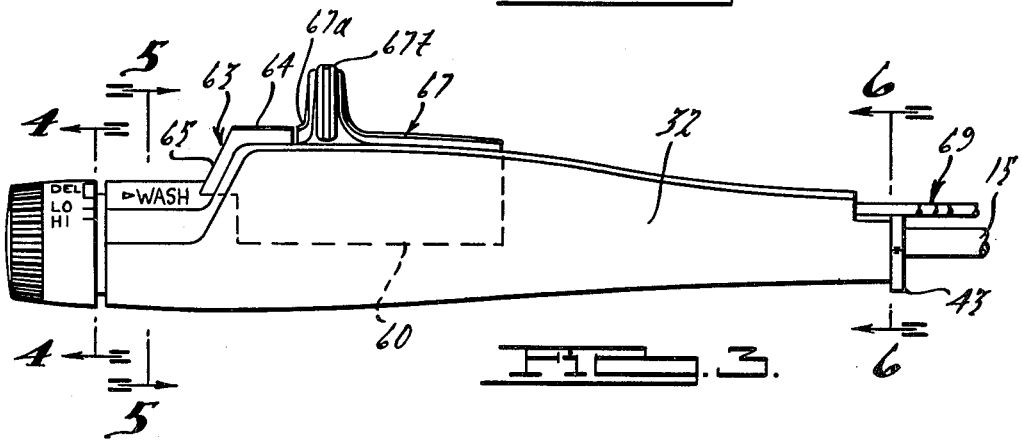
FIG. 3 is a side elevation view of the control handle of FIG. 2.

The first actuator button 63 is shown in FIGS. 2, 3 and 13 as protruding from one end of the channel in the intermediate section 32 of the handle and as having an exposed pair of intersecting planar sides or surfacs, one of which surfaces 64 is parallel to the longitudinal axis of the handle and the other surfaces 65 is inclined to said axis and the surface 64. The second actuator button 67 includes an abutment portion 67a and a tab portion 67t of which the latter projects further outwardly of or is elevated above the flat horizontal surface 64 of the first actuator button as shown in FIGS. 3 and 13. The abutment portion 67a of the second actuator button 67 faces the end of the first actuator button 63 opposite the inclined surface or end 65 thereof and is so slightly spaced therefrom as to be in nearly line contact engagement therewith so that when the first actuator button 63 is pushed, as by application of a force to the oblique end 65 thereof, from its normal or stable position to its second position, the first actuator button will conjointly actuate and move the second actuator button and its associated slide switch from its first stable position, labelled OFF in FIG. 2, to its second stable position, labelled ON, without the necessity of separate actuation or movement of the second actuator button 67.

Release of the operator's thumb or finger from the first actuator button 63 will then cause the return of that button and first slide switch 61 to the first stable position under the influence of the return spring 62. However, the second actuator button 67 and slide switch 66 will remain in their second stable or ON position from which they can be further moved to the third position labelled RESUME, which is a momentary contact position, by separate actuation of the tab portion 67t of the second actuator button by the thumb or finger of the operator.

Release of the tab portion 67t then returns the second actuator button and slide switch 66 from the aforesaid third position thereof under the influence of the spring 68 to the second or ON position of the second slide switch and actuator button.

As shown in the electrical schematic representation of the speed control slide switch assembly and external circuits controlled thereby, the slide switch 61 may be characterized as a D.P.D.T. or two position switch, while the slide switch 66 may be characterized as a D.P.T.T. (double pole triple throw) or three positon switch. In the speed control application in which the slide switch assembly and operating control stalk handle are to be employed, the slide switch 61 is the SET speed switch, which is operated by the first actuator button 63, and the switch 66 is the OFF-ON-RESUME switch, which is operated between its three positions by the second actuator button 67 or between its OFF and ON position by and conjointly with the first actuator button. The speed control switches operate in conjunction with a control servo 90, which includes a pair of electromagnet coils 91 and 93, a governor or vehicle speed actuated switch 94 and a brake or override switch 95. The governor switch 94 is operated to closed position when the vehicle attains a road speed of approximately 30 mph. Below this speed, the speed control system is disabled. Switch 95 is operated by the vehicle brake pedal to override the speed control function and permits the vehicle to be decelerated.

Assuming that the vehicle has attained a vehicle speed of or in excess of 30 mph and the operator desires to activate the speed control system, movement of switch 61, as be depressing the SET or first actuator button 63 inwardly toward the steering column and from its position shown to its second position, moves the second slide switch 66 from its OFF to its ON position and completes a circuit from B+ through the accessory feed of the ignition switch labelled I and through the movable bridging poles of switch 66 to a stationary switch contact labelled i of switch 66 and stationary contacts b and a of switch 61 to the holding coil 91 of the speed control servo 90, more fully described in U.S. Pat. No. 3,481,422.

Energization of the holding coil 91 closes its holding contacts 92 to maintain the energization of the coil, when the SET switch 61 is returned to its first stable position by spring 62 upon release of the first actuator button 63. In this position of the switch 61, an energization circuit for the locking coil 93 of the servo is established from B+ through contacts a and c of switch 61 with the second slide switch 66 left in its second stable or ON position from the initial actuation of the SET switch. Thus, it will be noted that actuation of the SET button turns on the speed control system and simultaneously sets the vehicle speed.

Actuation of the brake switch 95 will drop out the holding coil 91 and its contact 92. So long as the vehicle speed does not drop below 30 mph and the second slide switch has not been returned to its OFF position, the speed control system will remain operative. The original speed set by the actuation of the SET button can be resumed by activation of the second actuator button 67 and moving the second slide switch 66 from its second or ON position to its third or RESUME position in which position the holding coil 91 will be reenergized through the contact g of slide switch 66. Slide switch 66 will then be returned to its ON position by spring 68 upon release of the second actuator button 67.

To select a higher or lower speed than that to which the system is set, the vehicle is accelerated, or decelerated by depression of the brake pedal, and the SET or first actuator button 63 is actuated to drop out the locking coil 93 momentarily and to reenergize it when the SET button actuated or first slide switch 61 is returned to its first stable position by the spring 62.

What is claimed is:

1. In combination,
    a vehicle steering column,
    a turn signal switch having
        a stationary portion affixed to one end of the column and
        a movable contactor portion pivotally movably mounted on and relative to said stationary portion about a first axis extending longitudinally of the steering column,
    a headlamp beam selection switch having a depressible spring-biased plunger thereon and mounted on the steering column at a location longitudinally displaced from said turn signal switch,
    an actuation rod mounted for reciprocation on and extending longitudinally of the steering column and having one end thereof in engagement with the plunger of said headlamp beam selection switch for depressible actuation thereof upon longitudinal reciprocation of the rod.
    a control lever extending transversely of the longitudinal axis of the steering column and swingably movable in a first plane transverse to the axis of said column and in a second plane intersecting and mutually orthogonally related to said first plane and a
    motion translating assembly enabling selective actuation of said turn signal switch independently of said beam selection switch from swingable movement of said control lever in said first plane and selective actuation of said beam selection switch independently of said turn signal switch from swingable movement of said lever in said second plane,
    said motion translating assembly having
        a first portion drivingly coupled at one end to said movable contactor portion of said turn signal switch for rocking said movable turn signal contactor portion about said first axis upon swingable movement of said control lever in said first plane and
        a second portion affixed to said control lever and pivotally coupled to the other end of said first portion of said motion translating assembly for movement relative thereto on a second axis spaced from and normal to said first axis upon swingable movement of said control lever in said second plane, said second portion of said motion translating assembly having an actuator thereon extending inwardly toward the steering column and engaging the other end of said reciprocable actuation rod the longitudinal axis of which is aligned in axial registration with said first axis corresponding to the pivot axis of the movable portion of said turn signal switch,
    a drive post secured to and having a slotted end extending through said movable contactor portion at the said first axis corresponding to the pivot axis of said turn signal switch,
    a threaded nut attached to the said one end of said first portion of said motion translating assembly and having an upstanding drive nib thereon received within the slotted end of said drive post, and
    a threaded fastener screw extending through said drive post and into said threaded nut on the said first portion of said motion translating assembly for securing the motion translating assembly to the movable contactor portion of said turn signal switch.

2. The combination in accordance with claim 1 wherein said drive nib has a V-shaped notch therein.

3. The combination in accordance with claim 1 wherein said second portion of said motion translating assembly has a conical lever extending inwardly toward the steering column with a cup-shaped pocket in the end thereof and wherein said actuation rod has a rounded end received within the pocket in said lever.

* * * * *